United States Patent [19]
Ziegler

[11] 3,809,064
[45] May 7, 1974

[54] VESSEL COVER
[75] Inventor: Charles O. Ziegler, East Marion, N.Y.
[73] Assignee: Herman Kanfer, Plainview, N.Y. ; a part interest
[22] Filed: July 11, 1972
[21] Appl. No.: 270,670

[52] U.S. Cl. .............................. 126/381, 220/44 A
[51] Int. Cl. ........................................... A47j 27/00
[58] Field of Search .......... 220/44 A; 126/381, 384, 126/383–386

[56] References Cited
UNITED STATES PATENTS
1,676,146   7/1928   Krafft.................................. 126/381

Primary Examiner—George T. Hall
Attorney, Agent, or Firm—Carlos Nieves

[57] ABSTRACT

A cover for a vessel wherein liquids are boiled includes a circular member and a cap. The circular member includes a conical wall which is frictionally engageable with the vessel and an annular extension having a first and second arcuately spaced series of holes. The annular extension runs into a semi-circular annular groove having a number of circularly spaced holes, and the small diameter edge of the groove extends into the large diameter end of a second conical wall having a plurality of holes. The small diameter end of the second conical wall provides an access to the contents in the vessel. The cap includes a plurality of holes, a handle, and a large hole whose edge is frictionally engageable with the second conical wall to securely cover the access. When a liquid boils in the vessel, its vapor is vented to the atmosphere through the plurality of holes in the cap, and its foaming liquid is vented through the plurality of holes in the conical wall to the atmosphere and the groove. The resulting condensed liquid is returned through the number of holes in the groove to the vessel, thereby preventing the liquid in the vessel from boiling over the vessel's edge. The first and second arcuately spaced series of holes prevent the boiling liquid from disengaging the vessel and the cover.

3 Claims, 3 Drawing Figures

PATENTED MAY 7 1974 3,809,064

VESSEL COVER

The subject invention relates to cooking utensils and in particular to a cover for use with cooking vessels wherein boiling takes place.

It is an object of the present invention to provide a cover for a cooking vessel which prevents the boiling over of liquids in the cooking vessel.

It is another object of the present invention to provide a cover for a cooking vessel which is not displaced from its normal engagement with the cooking vessel by boiling liquids therein.

It is yet another object of the present invention to provide a cover for a cooking vessel which provides access to the inside of the cooking vessel while preventing the boiling over of liquids therein.

The above mentioned objects are met, according to the invention, by a cover for a vessel wherein liquids are boiled, comprising: (a) means for coupling the cover to the vessel; (b) vent means for coupling the vapors from the liquid boiled in the vessel to the atmosphere; (c) a trap exposed to the atmosphere; (d) vent means for coupling the foaming liquid from the liquid boiled in the vessel to the trap, whereby said foaming liquid is condensed; and (e) means for returning the condensed liquid to the cooking vessel.

Additional objects and features of this invention will become apparent by reference to the following description in conjunction with the accompanying drawings, in which.

Figure 1:
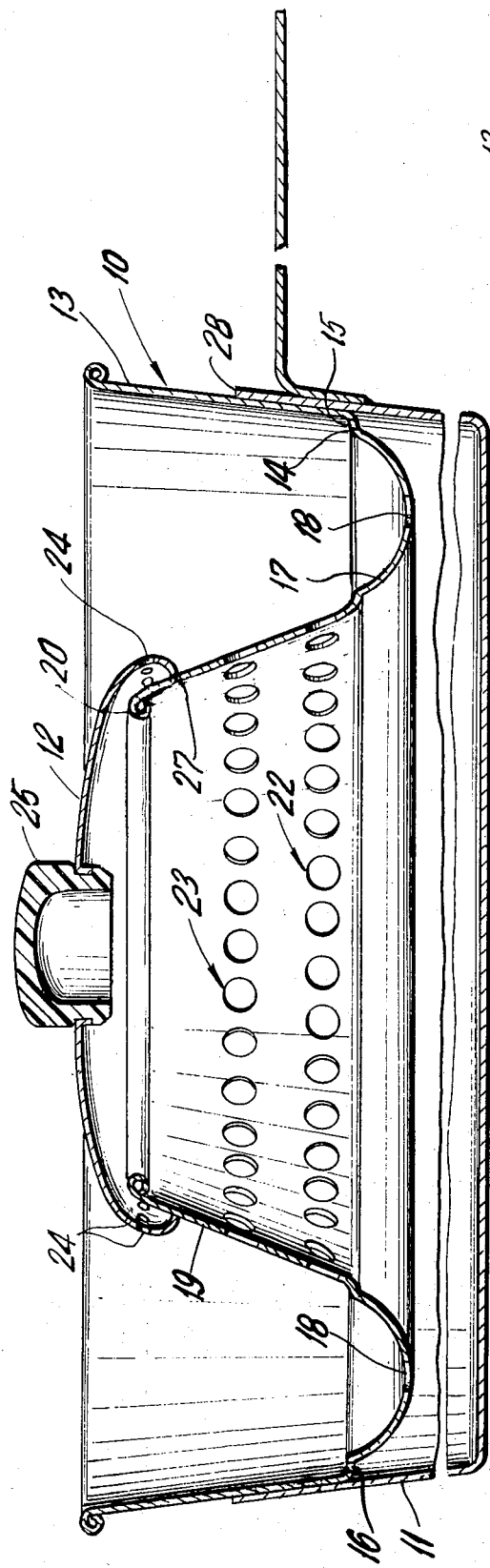
FIG. 1 is a cross-sectional view of a cover, according to the invention, engaged with a cooking vessel.

A cross-sectional view of a cover, according to the invention, is shown in FIG. 1. In general, the cover includes a unitary circular member 10 which is frictionally engageable with a cooking vessel 11, and a cap 12 which is frictionally engageable with the circular member 10.

Figure 2:
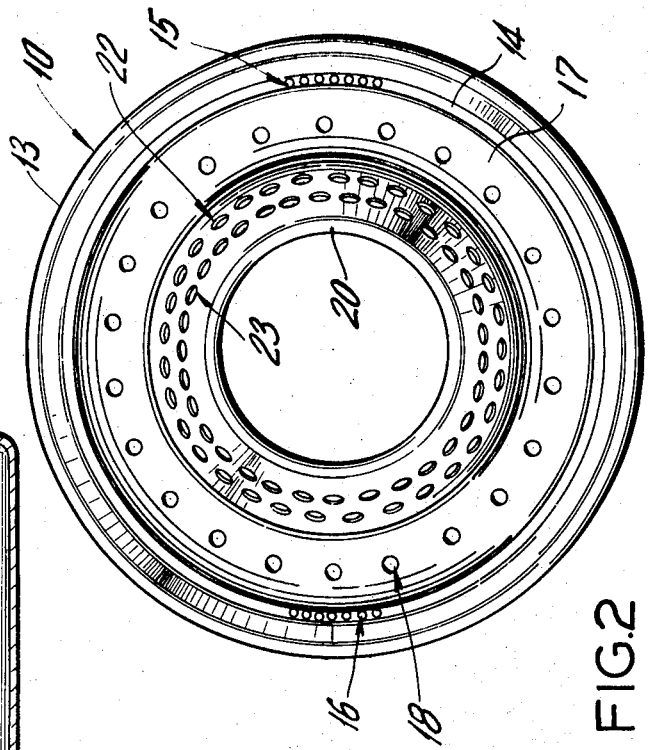
FIG. 2 is a top view of a circular member of the cover.

More particularly, as shown in FIGS. 1 and 2, the circular member 10 includes a wall 13 which resembles a truncated circular cone. The upper part of the conical wall has a larger diameter than the lower part of the wall to facilitate a frictional engagement between the circular member and the cooking vessel. The smaller diameter of the wall 13 includes an annular extension 14 which is perpendicular to and in the direction of the axis of the circular member. The annular extension includes a first series of arcuately spaced holes 15 and a second series of acruately spaced holes 16, the first and second series of holes being substantially diametrically opposed. The edge of the annular extension extends downwardly into an annular groove 17 having a semi-circular cross-section and a number of evenly spaced circular holes 18 along its annular bottom. The small diameter end of the groove 17 is joined to the larger diameter end of another conical wall 19 which resembles a truncated cone. The conical wall 19 extends upwardly from the annular groove 17 and its upper edge defines the edge 20 of a hole which may be used to load or unload the vessel 11 when it is being used in conjunction with the cover. The conical wall 19 includes a first plurality of holes 22 equally spaced about an imaginary circle defined by the intersection of a plane and the conical wall, and a second plurality of holes 23 equally spaced about a similar imaginary circle of smaller diameter, each of the holes from the second plurality of holes 23 being equidistant from its two closest holes in the first plurality of holes 22.

Figure 3:
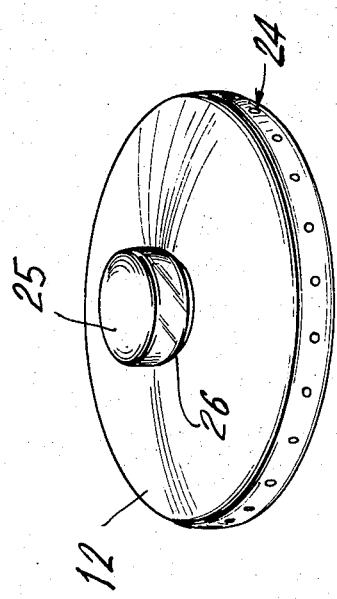
FIG. 3 is a perspective view of a cap of the cover.

Referring to FIGS. 1 and 3, the cap 12 is a circular sheet metal structure having, in general, an eliptic cross-section; a hole 26 for supporting a circular handle 25; and a hole, co-axially located with respect to hole 26, whose edge is frictionally engageable with the conical wall 19. In addition, the cap 12 includes a plurality of holes 24 spaced along, for example, a circle corresponding to the major diameter of the circular structure. Typically, the handle 25 is used to transport the cover and is made from plastic or other suitable materials which are capable of withstanding temperatures associated with liquids boiled in the cooking vessel 11.

As shown in FIG. 1, when the cover is engaged with the cooking vessel 11, the conical wall 13 frictionally engages the inside wall of the cooking vessel 11 and the edge 27 of the cap frictionally engages the wall 19. With such an engagement, if the cooking vessel includes a liquid and the liquid is caused to boil, the plurality of holes 24 provide an escape for resulting vapors and condensation which forms on the inside of the cap, and the foaming liquid is vented through the holes 22 and 23. As the foaming liquid passes through the holes 22 and 23, it contacts the air above the top surface of the cover and is caused by gravity to flow towards a trap which includes the groove 17. As the foam travels towards and into the groove 17, its bubbles burst and the resulting liquid flows through the holes 18 back into the cooking vessel 11. Further, as the liquid boils in the vessel, the lower air pressure over the top surface of the cover causes the vapors and condensations under the annular extension 14 to flow upwardly through the holes 15 and 16, thereby preventing the boiling liquid from lifting the cover to escape over the edge 28 of the cooking vessel or from creeping out through small spaces defined by distortions in either of the generally engaging parts of the wall 13 or the vessel 11. Thus, even if the user of the cooking vessel and cover mishandles and distorts the engaging parts of the wall 13 or the vessel 11 so as to prevent a complete frictional engagement between the cover and the cooking vessel, the cover is capable of preventing the boiling over of liquid in the vessel.

Although the cover described above includes a cap 12 and a circular member 10, it should be noted that if a hole for granting access to the inside of the vessel 11 is not desired, the cap could be an extension of the conical wall, with or without a hole for a handle. Moreover, although a circular cover for use with a circular cooking vessel has been described, it should be noted that a cover for vessels having, for example, rectangular shapes or the like can be readily provided according to the invention.

In the description set forth above, the cover has been, by way of example, related to a cooking vessel. However, the covers utility is not limited thereto. For example, the cover could be used in conjunction with industrial vats or the like wherein liquids are boiled.

Accordingly, it is to be understood that the description herein of a preferred embodiment, according to the invention, is set forth as an example thereof and is not to be construed or interpreted as a limitation on the claims which follow and define the invention.

What is claimed:

1. A cover for a vessel wherein liquids are boiled, comprising:
   a. a conical wall for frictionally coupling the cover to the vessel, said conical wall having an annular extension;
   b. a semi-circular annular groove extending from the extension;
   c. a second conical wall extending from the groove, said second wall defining a hole;
   d. a cap for covering the hole, said cap having at least one vent hole;
   e. a plurality of holes in the second wall for coupling foaming liquid from the liquid boiled in the vessel to the groove, thereby condensing the foaming liquid;
   f. a number of holes in the groove for returning the condensed liquid to the cooking vessel; and
   g. a series of holes in the extension for preventing the disengagement of the frictional coupling between the cover and vessel by boiling liquid.

2. A cover as defined in claim 1 wherein the series of holes are arcuately spaced on the annular extension, said series of holes comprising a first series of equally spaced holes diametrically opposed to a second series of equally spaced holes; wherein the number of holes in the groove are equally spaced along a circle; and wherein the plurality of holes are circularly spaced along the second conical wall.

3. A cover as defined in claim 1 wherein the cap includes a plurality of circularly spaced holes.

* * * * *